United States Patent [19]

Kuwabara et al.

[11] Patent Number: 5,184,313
[45] Date of Patent: Feb. 2, 1993

[54] CONVERSION DEVICE FOR LASER INTERFEROMETIC MEASURING APPARATUS

[75] Inventors: Akira Kuwabara; Yasufumi Koyama, both of Kyoto, Japan

[73] Assignee: Dainippon Screen Mfg. Co., Ltd., Japan

[21] Appl. No.: 531,040

[22] Filed: May 31, 1990

[30] Foreign Application Priority Data

May 31, 1989 [JP] Japan .................................. 1-140100

[51] Int. Cl.$^5$ ............................................ G01B 11/14
[52] U.S. Cl. .................................... 364/561; 364/770; 356/4.5; 356/358
[58] Field of Search .................... 356/3, 4.5, 345, 357, 356/358; 364/560, 561, 562, 770; 33/707; 377/17, 19, 24.1; 324/160, 175

[56] References Cited

U.S. PATENT DOCUMENTS

| | | | |
|---|---|---|---|
| 3,573,805 | 4/1971 | Kelling | 341/50 |
| 4,492,464 | 1/1985 | Bourdet et al. | 356/4.5 |
| 4,583,856 | 4/1986 | Moore | 356/358 |
| 4,643,577 | 2/1987 | Röth et al. | 356/358 |
| 4,729,653 | 3/1988 | Kobayashi | 356/4.5 |
| 4,803,646 | 2/1989 | Burke et al. | 364/561 |
| 4,807,264 | 2/1989 | Bauer | 377/24.1 |
| 4,879,732 | 11/1989 | Dorosz | 377/24.2 |
| 4,989,222 | 1/1991 | Lutts et al. | 377/24.1 |

FOREIGN PATENT DOCUMENTS

8904461 5/1989 PCT Int'l Appl.

OTHER PUBLICATIONS

Patent Abstracts of Japan; vol. 13, No. 120 (P-846)(3468) Mar. 24, 1989; & JP-A-63292002 (NTT) Nov. 29, 1988.
Patent Abstracts of Japan; vol. 4, No. 110 (P-22(3468), Aug. 8, 1980; & JP-A-55069004 (Toshiba) May 24, 1980.

Primary Examiner—Parshotam S. Lall
Assistant Examiner—Collin W. Park
Attorney, Agent, or Firm—Ostrolenk, Faber, Gerb & Soffen

[57] ABSTRACT

An A-phase pulse ($S_A$) and a B-phase pulse ($S_B$) are transmitted from a laser interferometic measuring device to a conversion device (5). When the distance-to-be-measured (l) is increasing, a conversion coefficient ($D_R$) is added to or subtracted from an initial value in an arithmetic calculator (53) at the rising edge and the trailing edge of the pulses ($S_A$, $S_B$). The conversion coefficient has a digital value of M-digits and represents a reference distance $\lambda/N$, where $\lambda$ is the wavelength of a laser beam ($LB_1$, $LB_2$) employed in the laser measuring machine and M and N are positive integers. A predetermined unit distance in the metric system corresponds to a unit number in the (M+1)-th digit. A distance pulse signal ($S_L$) is generated in response to a carry signal and a borrow signal from the arithmetic calculator, and is used in expressing a change of the distance in the metric system.

9 Claims, 4 Drawing Sheets

CONVERSION DEVICE FOR LASER INTERFEROMETIC MEASURING APPARATUS

BACKGROUND OF THE INVENTION

1. Field of the Invention

The present invention relates to a conversion device for converting a distance-measuring pulse obtained in a laser interferometic measuring device into a distance signal representing a distance in a prescribed measuring unit system such as the metric system.

2. Description of the Prior Art

A laser measuring machine is often used in measuring the distance between two points. In particular, a laser interferometic measuring machine is suitable for accurate measuring, and this type of measuring machine usually produces a distance-measuring signal as a pulse signal for every reference distance of $\lambda/N$ depending on the wavelength $\lambda$ of the laser, where N is a positive integer. On the other hand, apparatus utilizing a result of measurment by the laser measuring machine usually uses the metric system, and therefore, the pulse signal outputted from the laser measuring machine is required to be converted into a signal represented in a prescribed measuring unit system such as the metric system.

According to a first method of converting a unit system which is known in the art, the distance-measuring pulse outputted from a laser interferometic measuring machine is multiplied by a conversion coefficient representing the reference distance of $\lambda/N$ in the metric system.

Japanese Patent Laying Open Gazette No. 55-69004 discloses a second method where the distance-measuring pulse outputted from a laser measuring machine is divided by a rate-multiplier counter with a prescribed dividing ratio to thereby convert the distance-measuring pulse into a signal of the metric system. In the second method, when the reference distance of $\lambda/N$ is 0.0791 μm and a unit length in the metric system is set to be 0.1 μm, the dividing ratio is set to be $7910/10^4$. In this case, when ten pulses of the distance-measuring signal are supplied to the rate-multiplier counter, a signal of eight pulses is produced to indicate that a distance-to-be-measured is about 0.8 μm.

According to the first method, since multiplication is performed in the unit conversion operation, a computation speed is reduced as the number of significant digits increases in order to express distance-measuring data more accurately. Accordingly, when a distance-to-be-measured continuously changes at a high speed, it is difficult to obtain distance-measuring data in response to the rapid change of the distance-to-be-measured.

According to the second method, it is required to increase the number of counters in the rate-multiplier in order to improve accuracy of approximation. This increases the cost of the device and reduces the computation speed.

SUMMARY OF THE INVENTION

The present invention is directed to a conversion device for receiving a first pulse from a laser interferometic measuring machine every time a distance which is measured with the laser interferometic measuring machine is changed by a value related to a reference distance $\lambda/N$ and for converting the first pulse into a distance signal represented in a prescribed measuring system of units, where $\lambda$ is a wavelength of a laser beam employed in the laser interferometic measuring machine and N is a positive integer.

According to the present invention, the device comprises: (a) first register means for holding a conversion coefficient representing the reference distance in the form of digital data having M-digits, where M is a positive integer and a unit distance in the measuring system of units corresponds to a unit number in an (M+1)-th digit from a least significant digit in the digital data; (b) means for converting the first pulse into a timing pulse which is generated every time the distance is changed by the reference distance; (c) arithmetic calculator means for receiving a predetermined initial value and for adding the conversion coefficient to the initial value every time the timing pulse is generated, the arithmetic calculator means being operable to generate a carry signal every time a result of calculation exceeds a full range of M-digits; and (d) means for generating the distance signal every time the carry signal is generated.

Preferably, the laser interferometic measuring machine is operable to generate a second pulse as well as the first pulse in order to indicate a direction of a change in the distance. In this case, the means (b) includes: (b-1) means for receiving the first and second pulses and for generating the timing pulse in synchronism with the first and second pulses and further generating a direction signal indicative of the direction of the change in the distance.

The arithmetic calculator means may have: (c-1) means for inhibiting an addition of the conversion coefficient and for subtracting the conversion coefficient from the result of calculation every time the timing pulse is generated while the direction signal is at a predetermined level; and (c-2) means for generating a borrow signal every time the result of calculation becomes negative in the full range of M-digits.

The means (d) may include: (d-1) means for generating the distance signal every time either of the carry and borrow signal is generated.

In an aspect of the present invention, the device further comprises: (e) means for outputting the direction signal.

The present invention is also directed to a method of converting a first pulse signal representing a change of a distance between two points in a first system of units into a second pulse signal representing the change of the distance in a second system of units.

According to the present invention, the method comprises the steps of: (a) determining a reference distance R in the first system of units; (b) determining a unit distance $\Delta l$ in the second system of units; (c) calculating a conversion coefficient $D_R$ through the following equation (Eq. 1):

$$D_R = R \times m^M / \Delta l \qquad \text{(Eq. 1)}$$

where m is an integer larger than one and M is an positive integer; (d) representing the conversion coefficient $D_R$ with digital data having M digits in m-notation; (e) adding the conversion coefficient $D_R$ to a predetermined intitial value every time the first pulse is generated to obtain an accumulated value; and (f) generating the second pulse signal every time the accumulated value exceeds a full range of M digits.

Accordingly, an object of the present invention is to provide a unit conversion device which can convert a distance-measuring pulse of a laser interferometic measuring machine into a signal represented in a prescribed measuring system of units at a high speed.

These and other objects, features, aspects and advantages of the present invention will become more apparent from the following detailed description of the present invention when taken in conjunction with the accompanying drawings.

DESCRIPTION OF PREFERRED EMBODIMENTS

A. Structure of Apparatus and Operation Thereof

Figure 1:
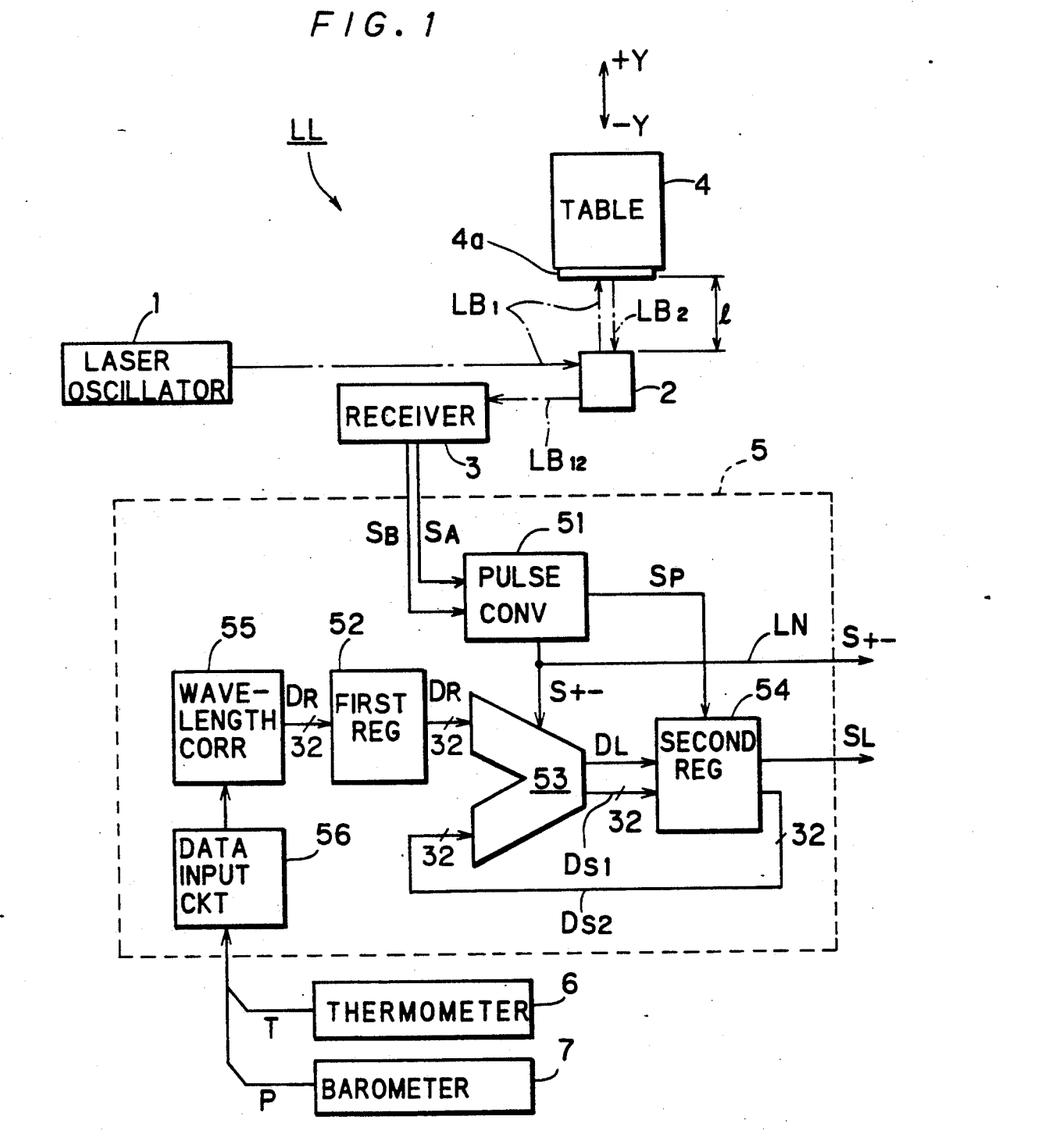
FIG. 1 is a block diagram showing the structure of a laser interferometic measuring system having a unit conversion device according to an embodiment of the present invention.

FIG. 1 is a block diagram of distance measuring apparatus utilizing a laser interferometic measuring device and a conversion device according to a preferred embodiment of the present invention.

The laser interferometic measuring device of apparatus LL comprises a laser oscillator 1 which generates a laser beam $LB_1$ having a wavelength $\lambda$, an interferometer 2, a receiver 3, a unit conversion device 5, and a reflecting mirror 4a. The laser oscillator 1, the interferometer 2, the receiver 3, and the reflecting mirror 4a constitute an ordinary laser interferometic measuring machine, which may be "LIL 3000 Laser Interferometer" obtainable from COHERENT LINEAR LTD., the United Kingdom.

The apparatus LL is operable to measure the distance 1 between the interferometer 2 and the reflecting mirror 4a fixed on the front surface of a table 4. The table 4 is driven by a motor (not shown) to move in directions (+Y) and (−Y). It is to be noted that the table 4 is provided by way of example only, and the reflecting mirror 4a may be fixed to an arbitrary objective body.

A part of the laser beam $LB_1$ emitted from the laser oscillator 1 reaches the reflecting mirror 4a through the interferometer 2, to become a reflecting beam $LB_2$. The other part of the laser beam $LB_1$ and the reflecting beam $LB_2$ are supplied from the interferometer 2 to the receiver 3 as a composite beam $LB_{12}$. The receiver 3 converts interference fringes made by the composite beam $LB_{12}$ into two scale signals $S_A$ and $S_B$ (distance-measuring pulse signals) of A and B phases. As described later, the distance-to-be-measured 1 is obtained from the numbers of the pulses of the scale signals $S_A$ and $S_B$. It is further found from a difference between the phases of the scale signals $S_A$ and $S_B$ whether the distance-to-be-measured 1 is increasing or decreasing, i.e., whether the table 4 is moving in the direction (+Y) or (−Y).

The conversion device 5 receives the scale signals $S_A$ and $S_B$, and produces a distance pulse signal $S_L$ representing the distance-to-be-measured 1 in a measuring unit of the metric system to output the same. In this embodiment, one pulse of the distance pulse signal $S_L$ is outputted for every 0.1 $\mu$m change of the distance-to-be-meaured 1. Moreover, a moving-direction signal $S_{+-}$ indicating whether the distance-to-be-measured 1 is increasing or decreasing is also outputted from the unit conversion device 5.

The conversion device 5 comprises a pulse converter 51, a first register 52, an arithmetic calculator 53, a second register 54, and a wavelength corrector 55. The arithmetic calculator 53 functions as an adder and a subtracter. The scale signals $S_A$ and $S_B$ outputted from the receiver 3 are supplied to the pulse converter 51 in the unit conversion device 5, and the pulse converter 51 outputs the moving-direction signal $S_{+-}$ and a position clock signal $S_P$. The moving-direction signal $S_{+-}$ holds an "H" level when the distance-to-be-measured 1 is increasing, and holds an "L" level when the distance-to-be-measured 1 is decreaing. The position clock signal $S_P$ is a pulse signal which rises up from an "L" level to an "H" level for every reference distance of $\lambda/N$ which is defined by the pulse period of the scale signals $S_A$ and $S_B$, where N is a positive integer.

When the position clock signal $S_P$ is supplied from the pulse converter 51 to the second register 54, the second register 54 outputs distance pulse data $D_L$ and addition data $D_{S1}$, which are supplied from the arithmetic calculator 53 in advance, as the distance pulse signal $S_L$ and augend data $D_{S2}$, respectively. The value of the distance pulse data $D_L$ and the addition data $D_{S1}$ are zeroes at the beginning of the measuring operation.

When the augend data $D_{S2}$ outputted from the second register 54 is supplied to the arithmetic calculator 53, the arithmetic calculator 53 performs addition or subtraction. If the moving-direction signal $S_{+-}$ holds an "H" level, the arithmetic calculator 52 adds conversion coefficient data $D_R$ supplied from the first register 52 to the augend data $D_{S2}$ supplied from the second register 54.

As described later, the conversion coefficient data $D_R$ are used in converting the change of the distance 1 represented in the unit of the reference distance $\lambda/N$ for the laser interferometic measuring machine into those in the metric system. The conversion coefficient data $D_R$ are supplied from the wavelength corrector 55 to the first register 52 in advance and are stored therein. At the beginning of the measuring operation, the augend data $D_{S2}$ are zero and the conversion coefficient data $D_R$ themselves are outputted as the addition data $D_{S1}$. On the other hand, if a carry signal or a borrow signal is generated in the arithmetic operation in the arithmetic calculator 53, as described later, the distance pulse data $D_L$ are also outputted from the arithmetic calculator 53.

The addition data $D_{S1}$ and the distance pulse data $D_L$ outputted from the arithmetic calculator 53 are supplied to the second register 54 to be stored therein as new stored-data. When the position clock signal $S_P$ is supplied to the second register 54, the addition data $D_{S1}$ stored in the second register 54 are fed back to the arithmetic calculator 53 as new augend data $D_{S2}$. In this case, when the value of the distance pulse data $D_L$ is "1", i.e., at an "H" level, the signal $S_L$ is also outputted from the second register 54. The moving-direction signal $S_{+-}$ is also outputted through a line LN.

Figure 2:
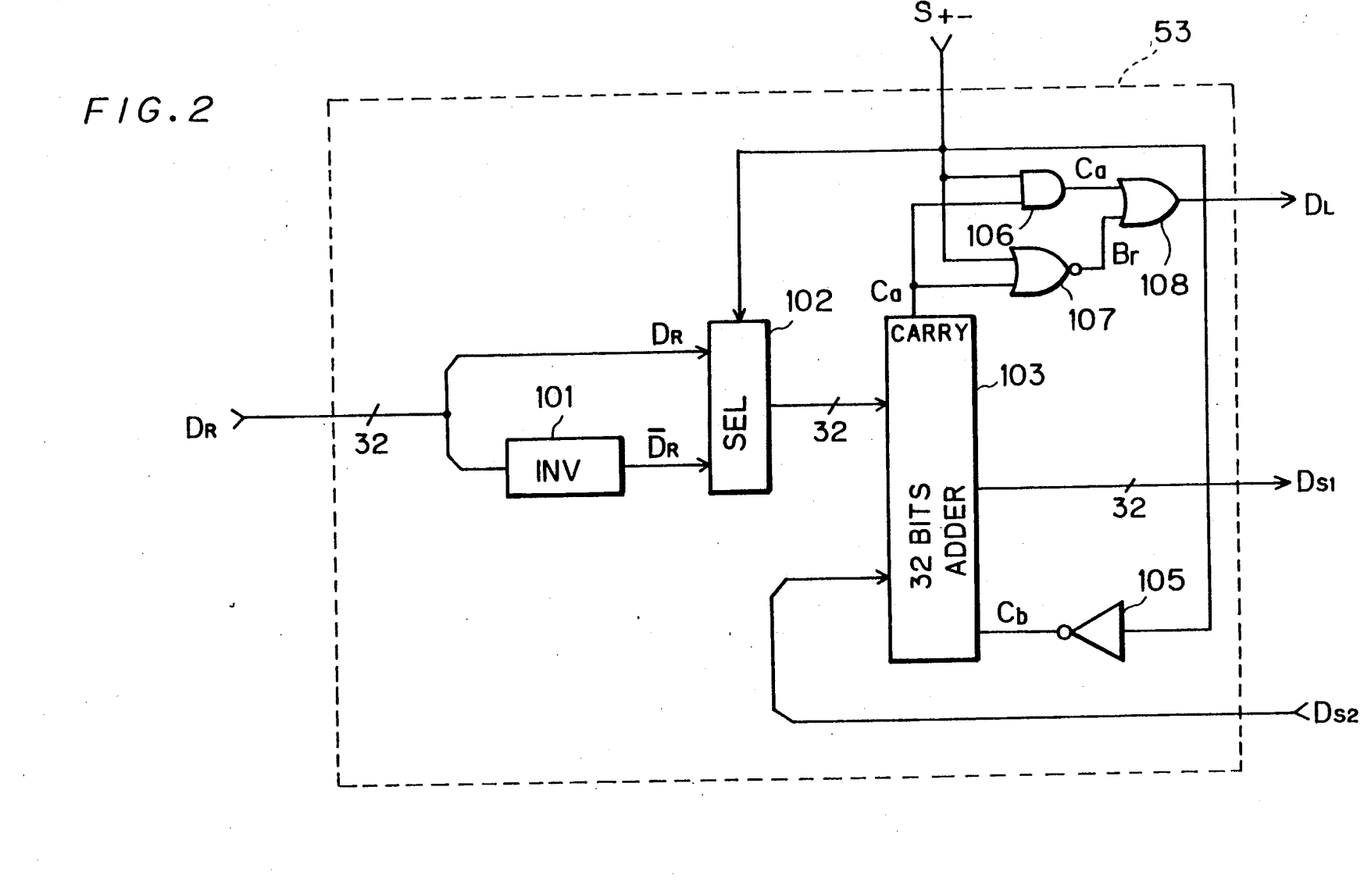
FIG. 2 is a block diagram showing the internal structure of an arithmetic calculator.

FIG. 2 is a block diagram showing the internal structure of the arithmetic calculator 53. The conversion coefficient signal $D_R$ is transmitted to an inverter unit 101. The output $\overline{D}_R$ of the inverter unit 101 is inputted to a selector 102 together with the conversion coefficient signal $D_R$ itself. When the moving-direction signal $S_{+-}$ is at an "H" level, the conversion coefficient signal $D_R$ is selected and is inputted in a 32-bits adder 103. A carry signal $C_b$ to the least significant bit in the adder 103 is obtained by inverting the logical level of the signal $S_{+-}$ in an inverter 105. The adder 103 adds the conversion coefficient $D_R$ to the augend data $D_{S2}$, and the addition data $D_{S1}$ are outputted therefrom. If a carry is caused in the most significant bit of the adder 103, the signal level on a CARRY terminal thereof rises from an "L" level to an "H" level and is transmitted to an AND gate 106 and a NOR gate 107 as a carry signal Ca. Since the moving-direction signal $S_{+-}$ is at the "H" level, the carry signal Ca passes through the AND gate 106 whereas the output of the NOR gate 107 is at an "L" level regardless of the signal Ca. Consequently, the carry signal Ca is outputted from an OR gate 108 as the distance pulse data $D_L$.

On the other hand, when the moving-direction signal $S_{+-}$ is at an "L" level, the output $\overline{D_R}$ of the inverter 101 is selected in the selector 102 and is transmitted to the adder 102. Since addition of the complementary value of the data $D_R$ to the augend data $D_{S2}$ with the carry signal Cb being at "1" is equivalent to subtraction of the data $D_R$ from the augend data $D_{S2}$, the adder 103 functions as a subtrator, so that the result of the subtraction is outputted as the "addition" data $D_{S1}$. During the time when adder 103 functions as a subtractor, the signal level on the CARRY terminal is normally at an "H" level and the output of the OR gate 108 is normally at an "L" level. When a borrow is caused in the "adder" 103, the signal level on the CARRY terminal becomes the "L" level. Since the moving-direction signal $S_{+-}$ is at the "L" level, the NOR gate 107 functions as an inverter for the signal from the CARRY terminal and the output of the NOR gate 107 becomes an "H" level whereby a borrow signal Br is obtained. The output of the AND gate 106 is at an "L" level regardless of the signal level on the CARRY terminal and the borrow signal Br appears at the output of the OR gate 108 as the distance pulse data $D_L$.

Any other construction which functions as an adder and a subtractor may be employed in the arithmetic calculator 53.

B. Content of Conversion Coefficient Data

The conversion coefficient data $D_R$, which are stored in the first register 52 in advance, are used in converting the change of the distance l for every reference distance $\lambda/N$, which is found from the scale signals $S_A$ and $S_B$, into the distance pulse signal $S_L$ each of whose pulses indicates 0.1 μm.

The conversion coefficient data $D_R$ are normalized in the form of a binary number of M bits as follows:

$$D_R = (\lambda/N) \times 2^M / \Delta l \quad (1)$$

where $\lambda$ is the wavelength of the laser beam, N is a positive integer, $(\lambda/N)$ is a reference distance which can be obtained from the scale signals, M is the number of bits of the conversion coefficient data $D_R$, and $\Delta l$ is a measuring unit in the metric system. Preferably, the integer N is selected among the integers from eight to thirty two.

In other words, the conversion coefficient data $D_R$ represent the reference distance $(\lambda/N)$ in the form of digital data having M-digits, and the unit distance in the metric system corresponds to a unit number in an (M+1)-th digit from the least significant digit in the data.

In this embodiment, the value of the conversion coefficient data $D_R$ is as follows:

$$
\begin{aligned}
D_R &= 0.633/16 \times 2^{32}/0.1 \\
&\approx 1699196436 \quad \text{(in decimal notation)} \\
&= 6547\text{AE}14 \quad \text{(in hexadecimal notation)}
\end{aligned}
$$

where $\lambda = 0.633$ μm, $N = 16$, $M = 32$, and $\Delta l = 0.1$ μm.

Table 1 shows the addition data $D_{S1}$ and the distance pulse data $D_L$ which are generated in response to the position clock signal $S_P$ and the moving-direction signal $S_{+-}$. The distance pulse data $D_L$ holds "1" (or an "H" level) when the carry signal Ca to the (M+1)-th digit or the borrow signal Br from the (M+1)-th digit is generated as a result of the addition or subtraction.

The carry signal Ca is generated every time the result of addition exceed the full range of the M-digits, while the borrow signal Br is generated every time the result of subtraction becomes negative in the full range of the M-digits.

TABLE 1

| $S_P$ (NUMBER OF PULSES) | $S_{+-}$ | $D_{S1}$ (HEXADECIMAL NUMBER) | $D_L$ |
|---|---|---|---|
| — | — | 0 | 0 |
| 1 | H | 6547AE14 | 0 |
| 2 | H | CA8F5C28 | 0 |
| 3 | H | 2FD70A3C | 1* |
| 4 | H | 951EB850 | 0 |
| — | — | 951EB850 | 0 |
| 1 | L | 2FD70A3C | 0 |
| 2 | L | CA8F5C28 | 1** |
| 3 | L | 6547AE14 | 0 |
| 4 | L | 0 | 0 |

*CARRY
**BORROW

As shown in Table 1, when three pulses of the position clock signal $S_P$ are successively generated while the moving-direction signal $S_{+-}$ holds the "H" level, a carry signal to the (M+1)-th digit is generated as a result of the addition. The reference distance $\lambda/N$ ($=0.633/16$) for the case of Table 1 is about 0.04 μm. One pulse of the position clock signal $S_P$ corresponds to the reference distance $\lambda/N$, and three pulses of the position clock signal $S_P$ correspond to about 0.12 μm accordingly. In other words, when three pulses of the position clock signal $S_P$ are generated, it is recognized that the distance-to-be-measured l has been changed by a measuring unit $\Delta l$ ($=0.1$ μm), and the value of the distance pulse data $D_L$ is forced into "1" whereby the distance pulse signal $S_L$ is outputted.

Incidentally, the discrepancy between the measuring unit $\Delta l$ ($=0.1$ μm) and an actual distance (about 0.12 μm) is stored in the second register 54 as a part of the addition data $D_{S1}$ ($=2FD70A3C$), and is further fed back to the arithmetic calculator 53 as a part of the augend data $D_{S2}$. Since the addition and the subtraction are performed on the basis of the augend data $D_{S2}$, the error or the discrepancy between the actual distance and the distance which is indicated by the distance pulse data $D_L$ is accumulated in proportion to the number of the generated pulses in the signal $D_L$.

The wavelength corrector 55 corrects the value representing the wavelength $\lambda$ of the laser beams $LB_1$ and $LB_2$ in accordance with the environment of the laser interferometric measuring system LL, and computes the conversion coefficient data $D_R$ on the basis of the corrected value of the wavelength $\lambda$ according to the equation (1). The value of the wavelength $\lambda$ of the laser beams $LB_1$ and $LB_2$ may be calculated or corrected as follows:

$$\lambda = \lambda_s n_s/n \tag{2a}$$
$$\approx \lambda_s (1 - \Delta n/n_s)$$
$$\Delta n/n_s \approx -[0.931(T-20) - 0.359(P-760) + \tag{2b}$$
$$0.050(P_H - 10) - 0.015(C-3)] \times 10^{-6}$$

where n is a refractive index of the air under the acutual condition, $n_s$ is a refractive index of the air under the normal measuring condition (20° C., 760 Torr), T is a temperature in centigrade, P is an atomospheric pressure in Torr, $P_H$ is a partial pressure of water vapour in Torr, and C is density of $CO_2$ in 0.01 volumetric percent.

Preferably, a thermometer 6 and a barometer 7 are provided in the system LL. The thermometer 6 measures the temperature in the room in which the system LL is provided, and generates temperature signal T representing the same. Similarly, the barometer 7 measures the atmospheric pressure and generates an atomospheric pressure signal P in accordance with the pressure value. These signals T and P are updated for every change of the temperature and the atmosphere pressure, and are transmitted to the wavelength corrector 55 through a data input circuit 56.

The wavelength corrector 55 corrects the value of the wavelength $\lambda$ by substituting the signal values T and P for the corresponding variables in the equations (2a) and (2b), and then obtains a corrected value of the data $D_R$ by substituting the corrected wavelength $\lambda$ for the variable in the equation (1). The corrected value of the data $D_R$ is registered therein in place of the old value of the data $D_R$. Therefore, an accurate measurement result can be obtained even if the room temperature or the atmospheric pressured changes with the passage of time. Another parameters representing the condition in the room may be also monitored and inputted to the wavelength corrector 55 for the correction of the wavelength $\lambda$.

C. Detailed Operation of the Conversion Device

Figure 3:
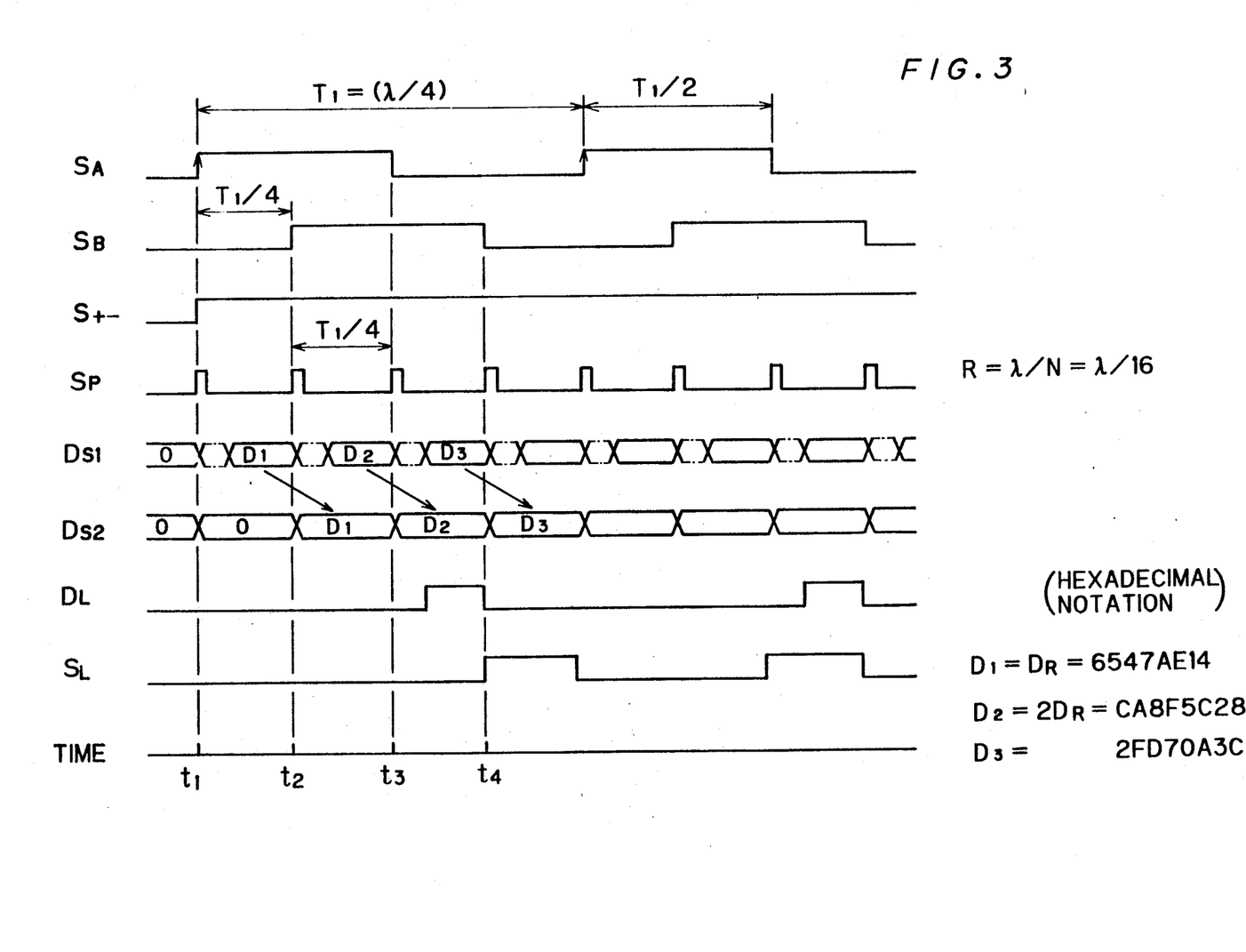
FIG. 3 is a timing chart showing the operation of the embodiment.

FIG. 3 is a timing chart showing the operation of the unit conversion device 5. FIG. 3 shows a case where the distance-to-be-measured l increases at a constant rate from a time $t_1$. The scale signals $S_A$ and $S_B$ are pulse signals which change at a regular period $T_1$ accordingly.

The scale signals $S_A$ and $S_B$ are distance-measuring pulses generated in response to the change of the distance-to-be-measured l. Each period $T_1$ corresponds to a time period in which the laser beams $LB_1$ and $LB_2$ progress in the air by a quarter of the wavelength $\lambda$ of the laser beams $LB_1$ and $LB_2$, that is, ($\lambda/4$). The scale signals $S_A$ and $S_B$ are pulse signals whose levels changes between an "H" level and an "L" level for every half period $T_1/2$. The phase of the scale signal $S_A$ and that of the scale signal $S_B$ are deviated from each other by a quarter period in the pulse repetition. On the basis of the direction or the sign of the deviation of these phases, it is judged whether the distance-to-be-measured l is increasing or decreasing. That is, if the distance-to-be-measured l is increasing, the B-phase scale signal $S_B$ is at an "L" level when the A-phase scale signal $S_A$ rises from an "L" level to an "H" level, as shown in FIG. 3. In this case, the moving-direction signal $S_{+-}$ outputted from the pulse converter 51 holds an "H" level. On the other hand, if the distance-to-be-measured l is decreasing, the B-phase scale signal $S_B$ is at an "H" level when the A-phase scale signal $S_A$ rises up, and the moving-direction signal $S_{+-}$ holds an "L" level (the latter case is not shown in FIG. 3).

The pulse converter 51 generates the position clock signal $S_P$ at every rising edge and trailing edge of the A-phase scale signal $S_A$ and the B-phase scale signal $S_B$. Therefore, the position clock signal $S_P$ is a pulse signal which is outputted for every quarter period, and reference distance $R = \lambda/N$ is equal to $\lambda/16$ ($= \lambda/4 \div 4$). In other words, the pulse interval $\lambda/4$ of the scale signals $S_A$ and $S_B$ is related to the reference distance $\lambda/16$, and in this example, the former is a multiple of the latter.

Before the time $t_1$, both of the addition data $D_{S1}$ and the augend data $D_{S2}$ are zeroes. After the table 4 starts to move, a first pulse of the position clock signal $S_P$ is outputted from the pulse converter 51 at the time $t_1$, and the second register 54 supplies the augend data $D_{S2}$ ($=0$) to the arithmetic calculator 53 accordingly. Then the addition data $D_{S1}$ are outputted from the arithmetic calculator 53 as a result of the addition. At this time, the value of the addition data $D_{S1}$ ($D_1$ in FIG. 3) is equal to that of the conversion coefficient data $D_R$. The addition data $D_{S1}$ ($=D_1=D_R$) are stored in the second register 54.

At a time $t_2$, the B-phase scale signal $S_B$ rises up, and a pulse of the position clock signal $S_P$ is generated. The data $D_1$ are outputted from the second register 54 as the augend data $D_{S2}$ accordingly, and are supplied to the arithmetic calculator 53. New addition data $D_{S1}$ ($=D_2=2D_R$) obtained as a result of the addition are stored in the second register 54 consequently.

At a time $t_3$, the A-phase scale signal $S_A$ falls, and a pulse of the position clock signal $S_P$ is generated. The data $D_2$ is outputted from the second register 54 accordingly as the augend data $D_{S2}$ and is supplied to the arithmetic calculator 53. Since a carry signal to the (M+1)-th digit is produced at this time as shown in Table 1, the distance pulse data $D_L$ holds "1" (of "H" level).

At a time $t_4$, a pulse of the position clock signal $S_P$ is generated in accordance with a negative transition of the B-phase scale signal $S_B$, and the second register 54 outputs the distance pulse signal $S_L$ to the exterior accordingly.

After the time $t_4$, the distance pulse signal $S_L$ is outputted every time when the carry signal Ca to the (M+1)-th digit is generated in the arithmetic calculator 53 although detailed explanation for the operation after the time $t_4$ is omitted here.

If the distance-to-be-measured l is decreasing, the distance pulse signal $S_L$ is outputted every time when the borrow signal Br from the (M+1)-th digit is generated in the arithmetic calculator 53 in the same manner as the above case.

An external apparatus, which will be described later, receives the distance pulse signal $S_L$ and the moving-direction signal $S_{+-}$ from the unit conversion device 5, and finds the change of the distance-to-be-measured l for every measuring unit $\Delta l$ ($=0.1$ $\mu m$) on the basis of the data $S_L$ and $S_{+-}$.

As described above, since the conversion of the scale signals $S_A$ and $S_B$ into the distance pulse signal $S_L$ is performed only on the basis of the addition or the substraction in the arithmetic calculator 53 in this embodiment, the operation speed is far higher than the case where multiplication is performed.

D. Application of the Unit Conversion Device

Figure 4:
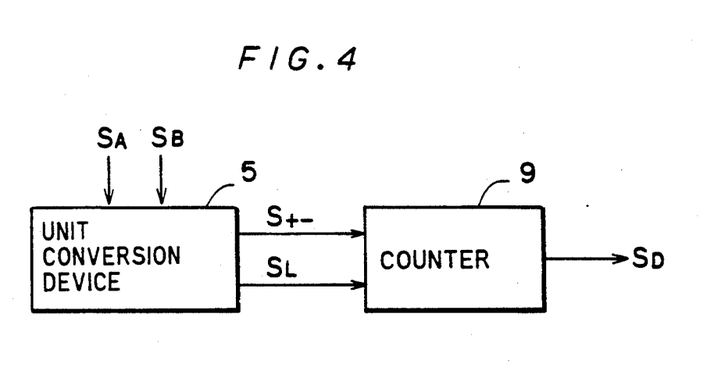
FIG. 4 is a block diagram showing a coupling between the unit conversion device and a counter.

FIG. 4 is a block diagram showing an electric coupling between the unit conversion device 5 and an up-/down counter 9. The distance pulse signal $S_L$ and the moving-direction signal $S_{+-}$ are transmitted to the counter 9. When the table 4 shown in FIG. 1 is moved in the direction (+Y) from a designated start point to a designated end point, the counter 9 counts the number of pulses in the signal $S_L$, so that the distance between the start point and the end point is obtained in the metric system of units. On the other hand, when the table 4 is moved in the direction (−Y), the counting value in the counter 9 is decremented for every pulse in the signal $S_L$. Consequently, the distance between the designated two points can be obtained together with the direction of the movement.

Figure 5:
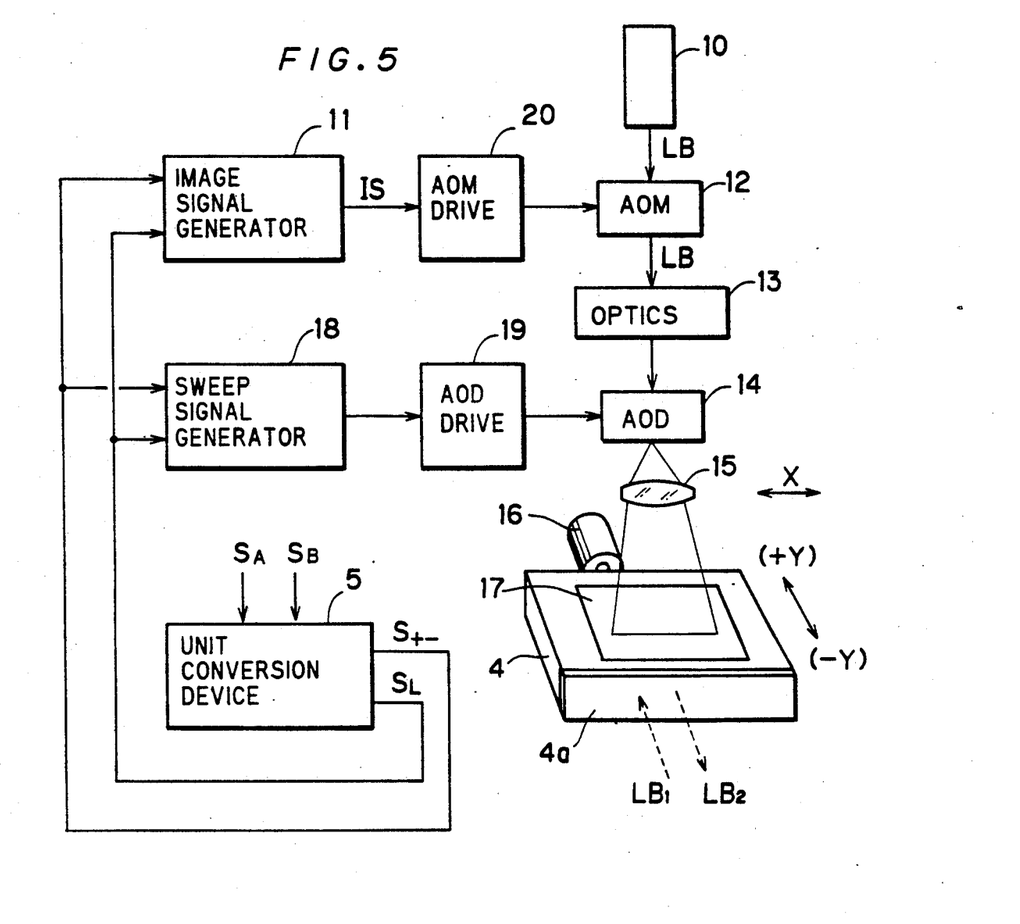
FIG. 5 is a block diagram showing an image recorder in which the laser interferometic measuring system is employed.

FIG. 5 is a block diagram showing an image recorder in which the laser interferometic measuring system LL is employed, where the elements of the system LL other than the unit conversion device 5 are not shown for convenience of illustration. The image recorder comprises a laser oscillator 10 generating a laser beam LB. The laser beam LB is modulated in an acousto-optical modulator (AOM) 12 in response to an image signal IS. The modulated beam LB passes through an optics 13 and then enters into an acoustic-optical deflector (AOD) 14. The AOD 14 periodically deflects the beam LB in the direction X and supplies the beam LB onto a photosensitive film 17 through a scanning lens 15.

The photosensitive film 17 is placed on a table 4, which corresponds to the table 4 in FIG. 1. A reflecting mirror 4a and laser beams $LB_1$ and $LB_2$ also correspond to those of FIG. 1. A motor 16 is coupled to the table 4 to move the same in the direction (+Y) or (−Y). A main scanning of the photosensitive film 17 is attained by the deflection of the beam LB, while the subscanning thereof is attained by the movement with the motor 16.

When the table 4 is moved in the direction (+Y), for example, the unit conversion device 5 generates the distance pulse signal $S_L$ and the moving-direction signal $S_{+-}$ which is at the "H" level. These signals $S_L$ and $S_{+-}$ are transmitted to an image signal generator 11 and are used therein for determining the generation and delivery timings of the image signal IS to an AOM driver 20. The image signal generator 11 may be a halftone dot signal generator having an image memory in which image data are stored for each scanning line.

The signals $S_L$ and $S_{+-}$ are also transmitted to a sweep signal generator 18 which generates a sweep signal for the main scanning in synchronism with the signal $S_L$. The sweep signal is delivered to an AOD driver 19 and is used therein for generating an AOD drive signal corresponding to the sweep signal. The AOD 14 is driven by the AOD drive signal to periodically deflect the beam LB.

When the level of the moving-direction signal $S_{+-}$ is changed to the "L" level, it is recognized that the movement of the table 4 is reversed. Accordingly, the image signal generator 11 inverts the order in reading the line images from the image memory in the subscanning direction.

In summary, the distance pulse signal $S_L$ is used in the image recorder in order to synchronize the modulation and the deflection of the laser beam LB with the movement of the photosensitive film 17 in the subscanning direction. Accordingly, the signal $S_L$ is employed as a scanning clock signal.

E. Modifications

The present invention is not limited to the above embodiment, but the following modifications are applicable.

(1) Although a pulse of the position clock signal $S_P$ is outputted for every quarter period $T_1/4$ of the A-phase and B-phase scale signals $S_A$ and $S_B$ in the above embodiment, it may be outputted for every period $T_1$ or every half period $T_1/2$. In these cases, the reference distance $\lambda/N$ becomes $\lambda/4$ or $\lambda/8$ accordingly.

However, if a pulse of the position clock signal $S_P$ is generated every time when a rising edge or a trailing edge of the scale signals $S_A$ and $S_B$ is produced, as in the above embodiment, accuracy of the measurement is improved.

In FIG. 3, the distance-to-be-measured l increases at a constant rate, and the scale signals $S_A$ and $S_B$ change at a regular period $T_1$ accordingly. However, the distance-to-be-measured l may change at an arbitrary rate in either direction (increase or decrease). Even in this case, the scale signals $S_A$ and $S_B$ periodically change for every distance $\lambda/4$, and the unit conversion device 5 accurately converts the scale signals $S_A$ and $S_B$ into the range pulse signal $S_L$.

(2) The distance-measuring pulses supplied from the laser interferometic measuring device to the conversion device 5 are not restricted to the scale signals $S_A$ and $S_B$ described above, and a combination of an upcounting pulse and a down-counting pulse, generated in response to a change of the distance-to-be-measured l, can be used.

In other words, the distance-measuring pulse supplied to the unit conversion device 5 may be any pulse which represents increase and decease of the distance-to-be-measured for every reference distance $\lambda/N$.

(3) The conversion coefficient data $D_R$ can be represented in digital data of m-notation where m is an integer larger than one. In this case, the conversion coefficient data $D_R$ are normalized as a number having M digits in m-notation, and the value of the conversion coefficient data $D_R$ is given as follows:

$$D_R = (\lambda/N) \times m^M / \Delta l \qquad (3)$$

CONCLUSION

According to the present invention, as described above, addition or subtraction of the conversion coefficient data, which are digital data of M digits, is performed for every reference distance of a laser interferometic measuring machine, and a converted distance signal is generated on the basis of a carry to the (M+1)-th digit or a borrow from the (M+1)-th digit. Since multiplication, whose operation speed is comparatively low, is not required, the unit conversion operation of the distance-measuring pulse of a laser interferometic measuring machine can be performed at a high speed, and cost of its elements can be reduced.

Although the present invention has been described and illustrated in detail, it is clearly understood that the same is by way of illustration and example only and is not to be taken by way of limitation. The spirit and scope of the present invention should be limited only by the terms of the appended claims.

We claim:

1. Distance measuring apparatus including a laser interferometic measuring device and a conversion device;

said laser interferometic measuring device generating out of phase first and second pulses each time a distance being measured changes by a reference distance $\lambda/N$, where $\lambda$ is a wavelength of a laser beam employed in said laser interferometic measuring device and N is a positive integer;

said conversion device receiving said pulses and generating an output signal representing the distance measured by said apparatus, said conversion device comprising:

(a) first register means for holding a conversion coefficient representing said reference distance in the form of digital data having M-digits, where M is a positive integer and a unit distance in said measuring system of units corresponds to a unit number in an (M+1)-th digit from a least significant digit in said digital data;

(b) means for converting said first and second pulses into a timing pulse which is generated every time said distance being measured is changed by said reference distance;

(c) an arithmetic calculator means for receiving a predetermined initial value and for adding said conversion coefficient to said initial value every time said timing pulse is generated, said arithmetic calculator means being operable to generate a carry signal every time a result of calculation exceeds a full range of M-digits; and (d) means for generating said distance signal every time said carry signal is generated.

2. Distance measuring apparatus of claim 1, wherein:
said laser interferometic measuring device is operable to generate said first and second pulses with a phase difference therebetween such that a sign of said phase difference indicates a direction of a change in said distance being measured;
said means (b) includes:

(b-1) means for receiving said first and second pulses and for generating said timing pulse in synchronism with said first and second pulses and further generating a direction signal indicative of said direction of said change in said distance;
said arithmetic calculator means has:

(c-1) means for inhibiting an addition of said conversion coefficient and for subtracting said conversion coefficient from said result of calculation every time said timing pulse is generated during said direction signal is at a predetermined level; and (c-2) means for generating a borrow signal every time said result of calculation becomes negative in said full range of M-digits;
said means (d) includes:

(d-1) means for generating said distance signal every time either of said carry and borrow signal is generated; and
said device further comprises:

(e) means for outputting said direction signal.

3. Distance measuring apparatus of claim 2, wherein:
said means (d) includes:

(d-2) second register means for holding said result of calculation and said distance signal, and for transmitting said result of calculation to said arithmetic calculator means and outputting said distance in response to said timing pulse.

4. Distance measuring apparatus of claim 3, wherein:
said means (b-1) includes:
means for generating said timing pulse at respective rising edges and trailing edges of said first and second pulses.

5. Distance measuring apparatus of claim 3, further comprising:

(f) means for calculating said conversion coefficient as a function of said wavelength $\lambda$ of said laser beam.

6. Distance measuring apparatus of claim 5, wherein:
said means (f) includes:

(f-1) means for calculating said conversion coefficient through the following equation (Eq. 1):

$$D_R = (\lambda/N) \times m^M / \Delta l \quad (\text{Eq. 1})$$

where m is an integer representing an notation of said digital data and $\Delta l$ is a predetermined unit distance in said measuring system of units.

7. Distance measuring apparatus of claim 6, wherein: the integer m is two.

8. Distance measuring apparatus of claim 7, wherein: said measuring system of units is a metric system.

9. Distance measuring apparatus of claim 5, further comprising:

(g) means for receiving a temperature signal from a thermometer associated with said device and for transmitting said temperature signal to said means (f):
said means (f) including:

(f-1) means for updating a value of said wavelength $\lambda$ as a function of said temperature signal: and (f-2) means for correcting said conversion coefficient as a function of an updated value of said wavelength $\lambda$.

* * * * *